United States Patent
Henksmeier et al.

(10) Patent No.: US 6,196,065 B1
(45) Date of Patent: Mar. 6, 2001

(54) DEVICE METERING AND MEASURING QUANTITIES OF LIQUID

(75) Inventors: Ralf Henksmeier, Delbrück; Manfred Köpl, Bochum, both of (DE)

(73) Assignee: Marconi Commerce Systems GmbH & Co. KG

( * ) Notice: Subject to any disclaimer, the term of this patent is extended or adjusted under 35 U.S.C. 154(b) by 0 days.

(21) Appl. No.: 09/171,029

(22) PCT Filed: Mar. 20, 1997

(86) PCT No.: PCT/EP97/01396

§ 371 Date: Oct. 28, 1998

§ 102(e) Date: Oct. 28, 1998

(87) PCT Pub. No.: WO97/41057

PCT Pub. Date: Nov. 6, 1997

(30) Foreign Application Priority Data

Apr. 29, 1996 (DE) .......................................... 296 07 736 U

(51) Int. Cl.⁷ .............................. G01F 3/04; F04B 23/00; B67D 5/16

(52) U.S. Cl. .......................... 73/261; 73/861.83; 417/313; 222/71

(58) Field of Search ................................. 73/261, 861.78, 73/861.83, 861.79; 417/313, 441, 505; 418/169, 170; 222/71

(56) References Cited

U.S. PATENT DOCUMENTS

| | | | |
|---|---|---|---|
| 3,963,146 | * 6/1976 | Esbjornsson | 222/59 |
| 4,953,403 | * 9/1990 | Springer | 73/261 |
| 4,986,445 | * 1/1991 | Young et al. | 222/71 |
| 5,363,988 | * 11/1994 | Saxton et al. | 222/14 |
| 5,447,062 | * 9/1995 | Kopl et al. | 73/261 |
| 5,704,767 | * 1/1998 | Johnson | 73/261 |
| 5,996,405 | * 12/1999 | Bergervoet et al. | 73/261 |

FOREIGN PATENT DOCUMENTS

| | | |
|---|---|---|
| 4142062 | 7/1993 | (DE) . |
| 0431873 | 6/1991 | (EP) . |
| 0440845 | 8/1991 | (EP) . |
| 0532202 | 3/1993 | (EP) . |
| 2232507 | 1/1975 | (FR) . |
| 9312405 | 6/1993 | (WO) . |

* cited by examiner

*Primary Examiner*—Harshad Patel
(74) *Attorney, Agent, or Firm*—Martin A. Farber

(57) ABSTRACT

A device for metering and measuring quantities of liquid, in particular in a pump for liquid fuels, having a plurality of volume meters, an assigned valve being arranged upstream of each volume meter, and having a liquid supply which branches into individual supply lines opening out into the valves, wherein the valves (5) and the volume meters are assigned to a housing (1, 2, 3) configured in the form of a block, which housing has an inlet opening (4) and supply ducts (6), which branch off from the inlet opening (4) to the valves (5) and form the individual supply lines, a first housing block (1) forming the inlet opening (4) and valve connection openings (8) covered by a respective valve head (7), in which valve connection openings (8) a respective supply duct (6) opens out and from which proceeds a respective connecting duct (10) to the assigned volume meter, which connecting duct can be closed off by a piston (9), a disk, a diaphragm or the like of a valve (5), the volume meters being assigned in each case separately to a second housing block (2, 3) and each second housing block (2, 3) forming the rotor housing for two mutually engaging screw spindles (11, 12) of a screw-spindle meter, which spindles allow axial through-flow, and those ends (2', 3') of the second housing blocks which are assigned to the axial bearings (13, 14) of the screw spindles covering outlet openings (15) in the connecting ducts.

22 Claims, 11 Drawing Sheets

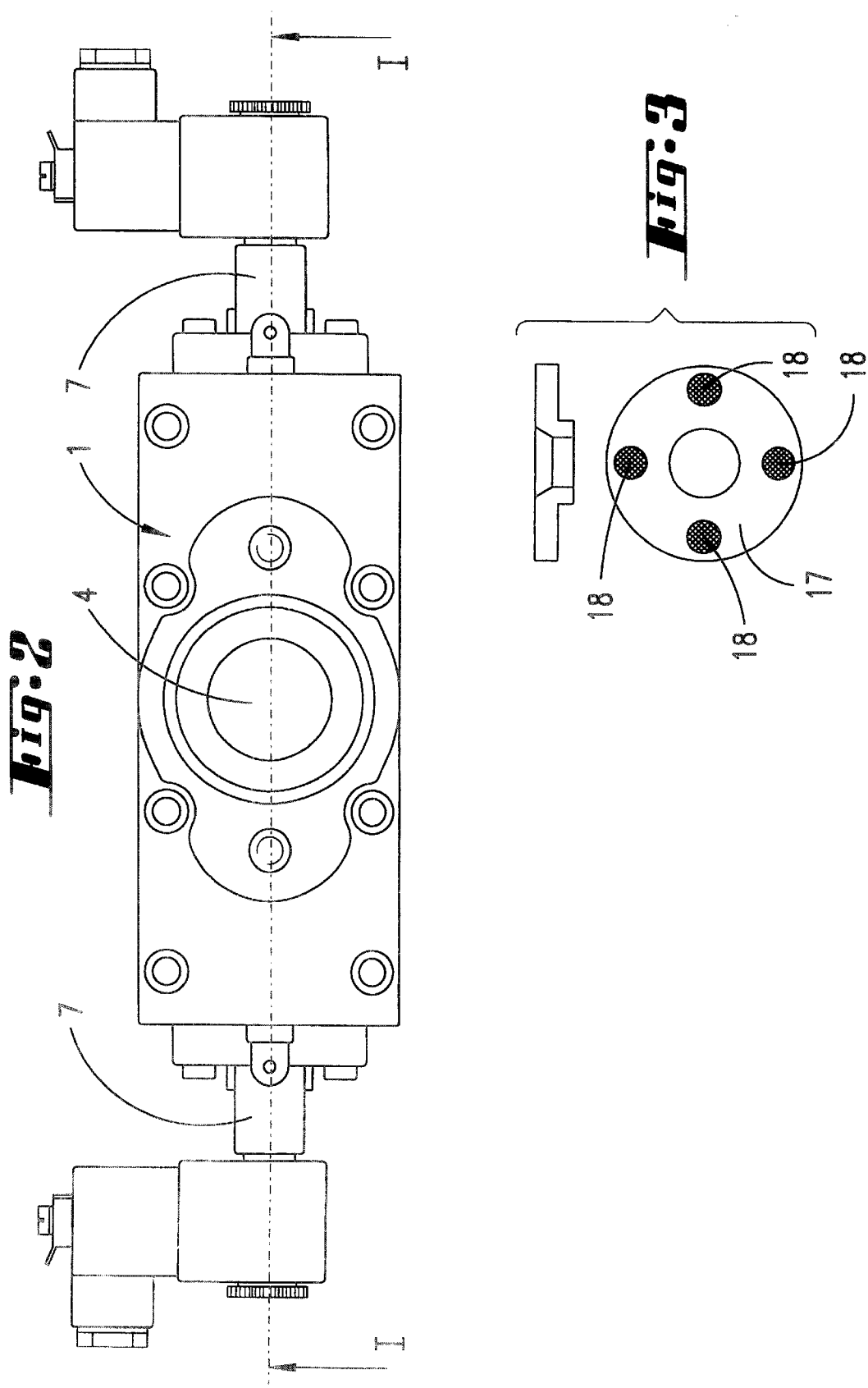

DEVICE METERING AND MEASURING QUANTITIES OF LIQUID

FIELD AND BACKGROUND OF THE INVENTION

The invention relates to a device for metering and measuring quantities of liquid, in particular in a pump for liquid fuel.

A device of this type is known in the prior art. In the case of the known device, use is made of one or more volume meters in the form of piston displacement meters, each volume meter being assigned a valve. The valve and volume meter are flanged together by means of pipes, just like valve and liquid supply. The liquid supply comes from a pump which pumps the liquid fuel from a reservoir tank. The known device not only requires a great deal of space, it is also expensive to produce. Furthermore, the known device ought to be improved in respect of its operating reliability.

SUMMARY OF THE INVENTION

It is an object of the invention to improve a device of this type in terms of production technology and use technology and to develop it in terms of reliability of use.

The invention is distinguished by a small physical size, The device is also simplified in terms of manufacturing technology, as a result of the block design. The housing is shaped by material-removing machining, for example drilling or milling, from the ends and/or broad sides.

In this case, the housings assigned to the volume meters can be machined exclusively on the ends. In addition, the sealing arrangement is simplified by the direct joining together of the individual blocks, with the result that the end of the block carrying the screw-spindle arrangement can be covered by the broad side of the valve block. The bearing chambers for the axial bearings of the spindles are thus covered optimally in a sealing manner. A favorable vibration behavior has also been shown, inter alia, particularly when the device according to the invention is used above a delivery pump, the device being borne by the delivery pump itself. It has furthermore been shown that the device according to the invention requires virtually no recalibration and yields quantities of liquid which are dimensionally accurately metered to a high degree, and measures them with high dimensional accuracy. Pipe connection lines between the individual housing blocks can be completely dispensed with since the housing openings are sealed in a simple manner owing to the housing surfaces lying directly on top of one another. It has likewise turned out to be advantageous that the valves are formed both by the housing and by valve heads placed onto valve connection openings, the valve heads being assigned the control elements for the valves. In an advantageous manner, the second housing blocks, in which the spindles are arranged, are seated by their ends on a broad side of the first housing block. This makes it possible to form the preferred U-shape of the overall housing. The valve connection openings can be assigned to the ends of the first housing block, with the result that the two valves are situated opposite one another. The housing blocks preferably have a parallelepipedal shape. The ends have a square base area. The valve piston can be designed as a freely moving piston, as a diaphragm or the like, and preferably moves within the separating plane between housing block and valve head, in other words through the valve connection opening. A supply duct which proceeds from the inlet opening, which is preferably closed off by a nonreturn valve, opens out into the valve connection opening. This supply duct preferably opens out into an annular space under the edge region of the piston or of the diaphragm. The annular space encloses the connecting duct which connects the valve to the volume meter. The volume meter preferably comprises two mutually engaging screw spindles through which axial flow takes place and which are subjected to rotary driving by the through-flowing quantity of liquid in accordance with the displacer principle. A device of this type for measuring quantities of liquid is disclosed in DE 41 42 062. One of the two spindles may bear a pulse generator wheel provided with magnets which move back and forth under a magnetic sensor. The pulses generated in the process are fed to a pulse conversion and measuring device in which quantitative values are derived from the electronic pulses and are displayed on a display. The valve heads placed onto the valve connection openings with the interposition of a seal may have solenoid valves as actuating elements. These solenoid valves may in each case form a pilot valve and a bypass valve. The pilot valve opens overflow ducts provided in the valve, so that the valve piston can be shifted into an opening position. When the pilot valve is closed, a return spring ensures that the valve piston or the like is shifted back into a closure position. A bypass valve may be provided in addition to the pilot valve, which bypass valve opens a bypass opening between the supply duct and the connecting duct, thereby enabling sensitive metering of fuels. This is necessary particularly when the device is intended to be used within a pump at which predetermined quantities of fuel can be supplied. The housing block having the screw spindle has two overlapping holes whose internal diameter corresponds to the external diameter of the spindles, with the result that the spindles can rotate freely therein. At the ends of the overlapping holes, the cavity of the housing block widens into chambers having a larger cross section. These cross-sectionally larger chambers form bearing receptacles for the axial bearings of the spindles. The axial bearings of the spindles are preferably ball bearings and are freely accessible from the end of the housing block and are covered by the block wall of the adjoining housing in the assembled state. While one end of the second housing block is covered by the first housing block, the other, opposite end may be covered by a sensor block arranged in alignment with the second housing block. This sensor block then covers the chamber and bears said magnetic sensor which interacts with the axially projecting rotor. An end termination may be formed by the second housing block by means of an axial outgoing line for the metered liquid. In a preferred development of the invention, which has independent character, the measuring block arrangement is mounted above a delivery pump. In this case, the spindles lie in the horizontal direction. The design of the delivery pump is also intrinsically inventive and has independent importance. It is important, in particular, that the delivery pump forms an insert designed as an internal gear pump. This insert enables the essential parts of the pump which are susceptible to wear to be exchanged in a simple manner without the entire housing having to be removed from the pump. The insert has a flanged cap which covers a receptacle opening for the internal gear pump and can be screwed to the pump housing. The delivery pump advantageously has a double gas separator with float-controlled liquid recirculation. The gas separator is fitted inside the pump body and has a relatively small volume yet nevertheless enables even diesel fuel to be dispensed without any bubbles. In this case, it is regarded as advantageous that the gas separator has a total of two cyclones arranged in mirror-inverted fashion, into which cyclones the pumped fuel is introduced and in which, on account of the centrifugal acceleration, the gas components fall back radially inward and can escape upward. Arranged above the cyclone is a displacer chamber in the form of a bell which switches a solenoid valve at an elevated gas concentration, said valve switching off the valves in the measuring block, with the result that the pump initially has only a degassing action. The gas separator preferably has two chambers separated by an overflow edge. A float may be arranged in the second chamber, said float closing off a recirculation opening through which the liquid forming from the condensed gas can be recirculated to the intake end of the pump. The device can also be used in submersible pump operation.

BRIEF DESCRIPTION OF THE DRAWINGS

With the above and other objects and advantages in view, the present invention will become more clearly understood in connection with the detailed description of preferred embodiments, when considered with the accompanying drawings of which FIG. 2 shows a view in the direction of the inlet opening of the first exemplary embodiment, FIG. 3 shows a detail illustration of the rotor.

DETAILED DESCRIPTION OF THE PREFERRED EMBODIMENTS

The measuring block arrangement according to the invention serves to meter and to measure any type of fuel, in particular gasoline, but also diesel fuel in a pump, for example a pump for motor vehicles. The device illustrated in FIG. 1 can be arranged above a delivery pump 25, for example in the manner illustrated in FIG. 10.

Figure 1:
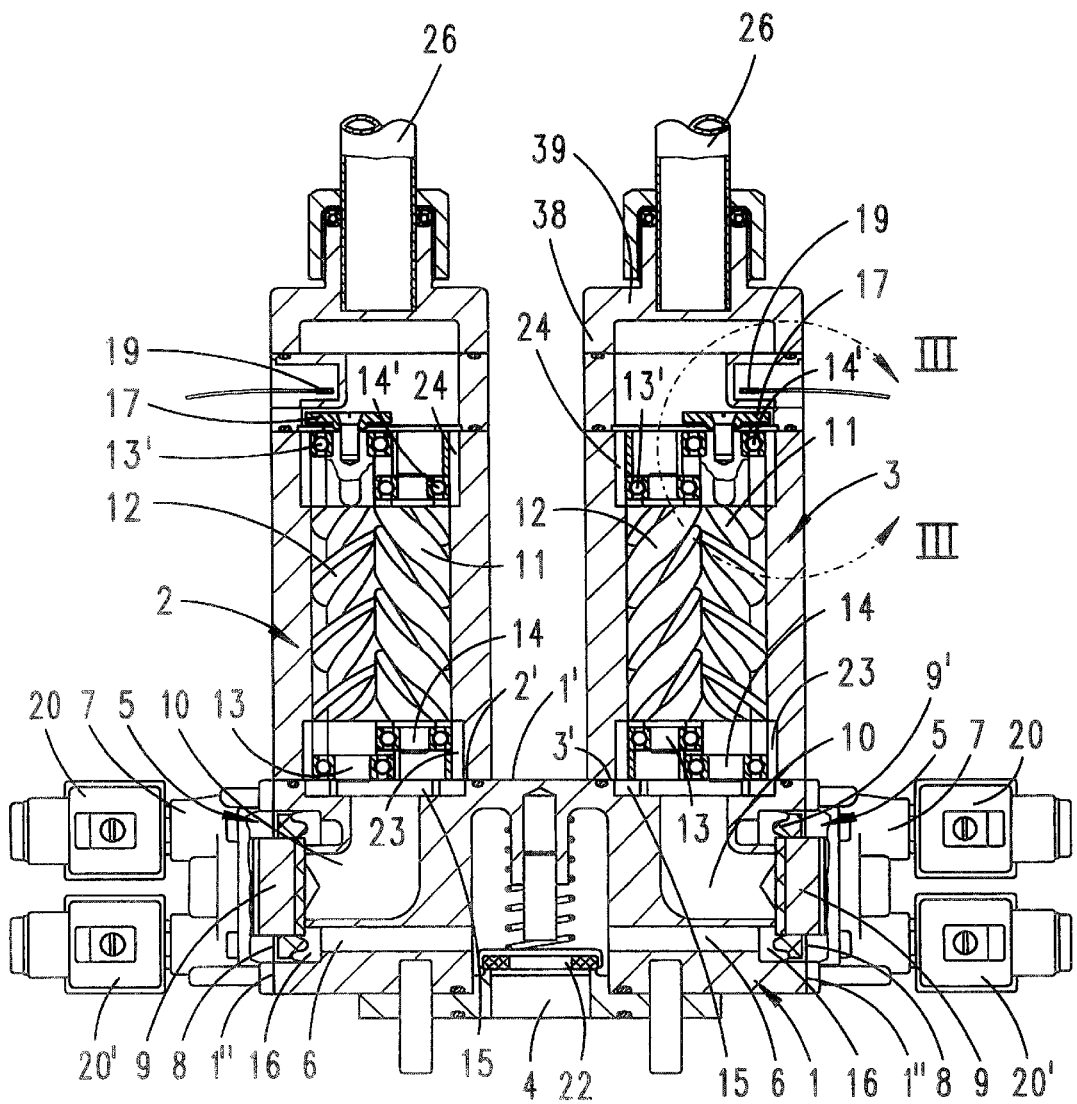
FIG. 1 shows a measuring block arrangement in cross section.

The device illustrated in FIG. 1 has a parallelepipedal valve housing 1, at each of whose ends 1" a valve connection opening 8 is provided. Two spindle housings 2, 3 are screwed onto the broad side 1' of the valve housing 1, said spindle housings being positioned parallel and spaced apart from one another. In this case, the square end faces 2', 3' rest flat on the rectangular broad side surface 1' of the valve housing block 1. The valve housing has an inlet opening 4 situated opposite to the broad side 1', which inlet opening can be closed off by a nonreturn valve 22 counter to a spring, with the result that only liquid from a pump can pass through the inlet opening 4 into the valve housing 1.

The inlet opening 4 has a circular cross section and has a screw-on flange for a through-flow connection to the pump 25. The liquid supply line proceeding from the inlet opening 4 branches immediately downstream of the nonreturn valve into opposite supply ducts 6, which open out into the valve connection openings 8. The valve connection openings 8 are each covered by a valve head 7. The piston 9 moving transversely with respect to the separating plane between valve head 7 and end face 1" is encapsulated by the valve head 7. The piston 9 and a diaphragm 9' projecting all around the circular piston cover an annular space 16, into which the supply duct 6 opens out. Situated within the annular space 16 is the connecting duct 10, which is covered by the piston 9 in the closed position, has a rectangular bend and opens out toward the broad side into an outlet opening 15. The outlet opening 15 is covered and sealed by the spindle housing 2, 3. The outlet opening 15 can form ribs 35 on which the axial bearings 13, 14, which are designed as ball bearings, can be supported in the axial direction.

The axial bearings 13, 14 lie in a chamber 23, which is assigned to the spindle housing 2, 3 and is open at the end. The two mutually engaging screw spindles 11, 12 are likewise supported by ball bearings 13', 14' at the other end.

The outlet opening 15 is covered by an O-shaped sealing ring 36, which is located in a groove in the broad side 1' and comes to bear in a sealing manner against the end 2', 3' of the spindle housing 2, 3. Ribs 37, which serve for the radial fixing of the ball bearings, likewise project inward in the chamber 23. The ball bearings are arranged axially offset with respect to one another.

Figure 4:
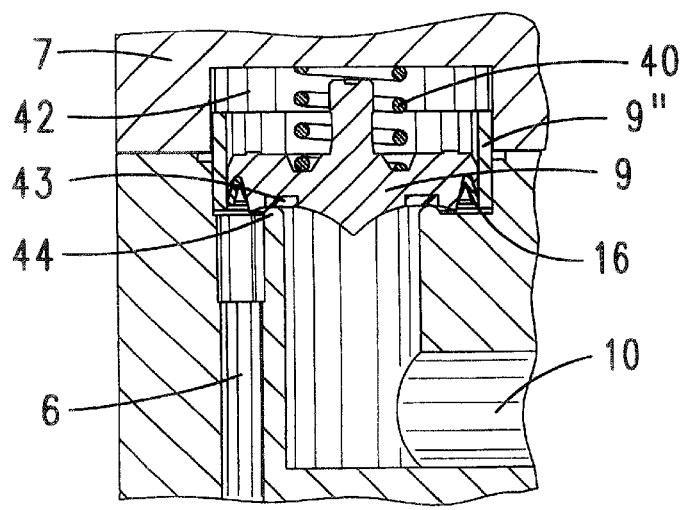
FIG. 4 shows an alternative version of a valve.
Figure 5:
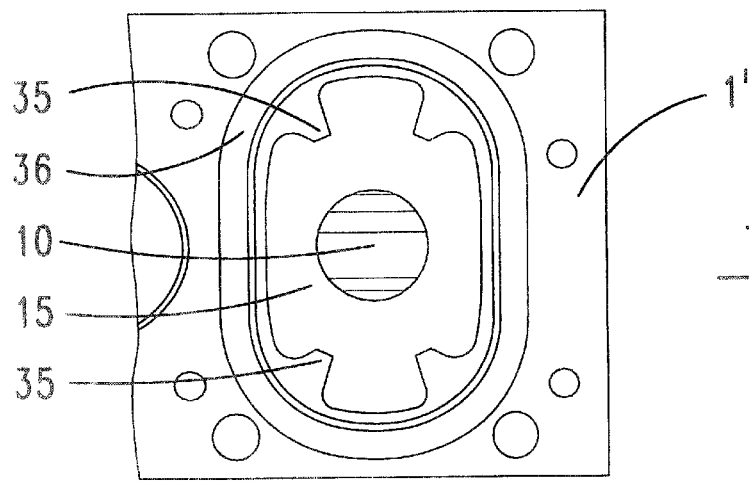
FIG. 5 shows the broad side view,of the outlet of the connecting duct.
Figure 6:
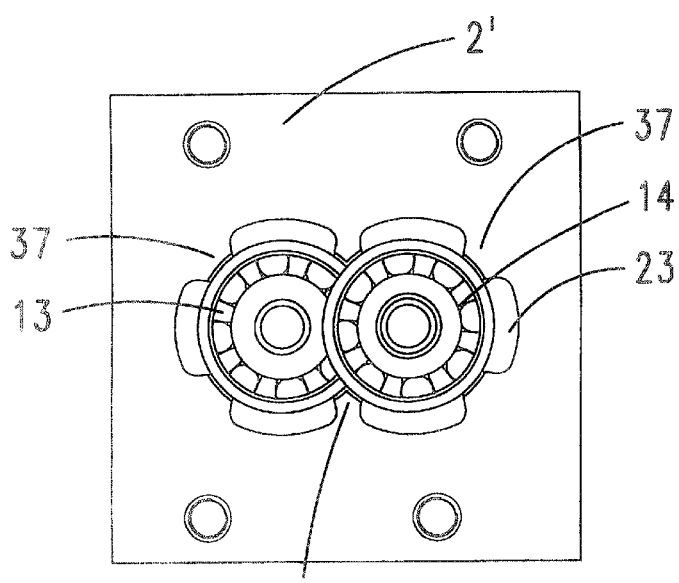
FIG. 6 shows the end view of a spindle housing located oppositely with respect to the illustration in accordance with FIG. 5.

A sensor housing 38 is provided on the end opposite to the end 2', 3'. A magnetic sensor 19, for example a Hall element, is provided in the sensor housing 38. The Hall element 19 interacts with the rotor 17, which is illustrated in FIG. 4 and is seated on the axis of the spindle 11. The rotor has a total of four magnets 18, which are each situated at an angle of 90° relative to one another. The rotor lies in the sensor housing 38.

The sensor housing 38 is covered by an outgoing line flange 39, the outgoing line 26 to the dispensing nozzle or the like being connected to said flange.

The valve head can form two solenoid valves 20, 20'. The piston 9 can be moved by the solenoid valve 20 via a pilot control arrangement. The valve 20' can open a bypass 21, which connects the supply duct 6 to the connecting duct 10.

Figure 7:
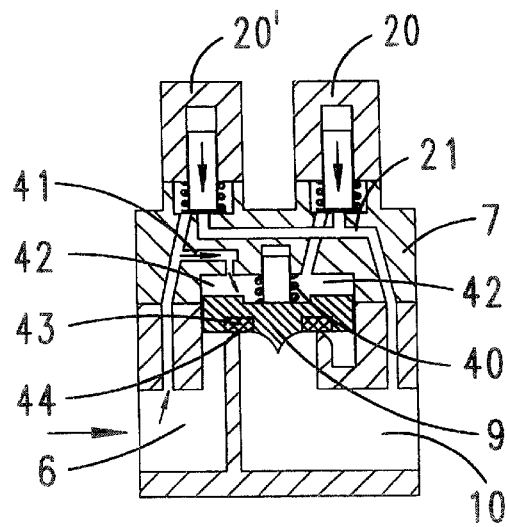
FIG. 7 shows a first functional illustration of a double valve in the closed state.
Figure 8:
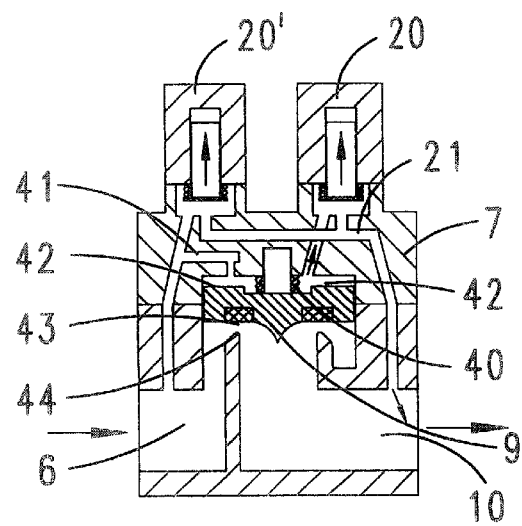
FIG. 8 shows an illustration in accordance with FIG. 7 in the open state.
Figure 9:
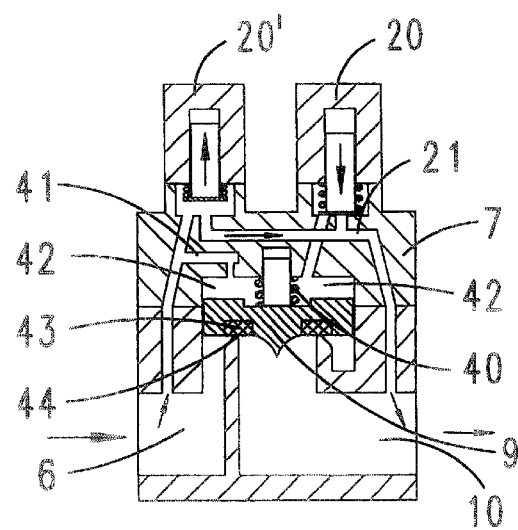
FIG. 9 shows an illustration in accordance with FIG. 7 in the bypass position.

An alternative valve arrangement is illustrated diagrammatically in FIGS. 7 to 9. The valve piston is centrally pointed and is supported by means of a spring 40 on the valve head 7. In the deenergized state of the magnets of the valves 20, 20', the pilot valve 20 and the bypass valve 20' are closed. Owing to the duct 41 between the supply duct 6 and the valve space 42 above the piston, the same pressure prevails on both sides of the piston. The larger effective area above the piston means that the valve remains closed (FIG. 7). The piston 9 is seated by its sealing ring 43 on the annular valve seat opening 44 in the connecting duct 10.

Switching the electric current on causes the pilot valve 20 and the bypass valve 20' to be opened, with the result that the pressure in the valve space 42 above the piston is reduced relative to the outlet end of the valve block 10. As a result of the higher fuel pressure on the underside, the piston is raised and the valve is open (FIG. 8).

The refueling operation is initially carried out in the open position illustrated in FIG. 8. In order to end the refueling operation, the valves 20, 20' are deenergized. The bypass 21 is then closed off, as is the connection between valve space 42 and the duct 10. Liquid can continue to flow through the connection between the supply duct 6 and the valve 42. The piston closes owing to the higher effective area on the rear side of the piston relative to the annular space.

If a defined quantity is intended to be dispensed, then firstly only the pilot valve 20 closes proceeding from the open position illustrated in FIG. 8. The fuel flow, which is then restricted and amounts to approximately 2 l per minute, enables exact closing of the bypass valve 20' and thus the ending of the fueling operation precisely when the preselected dispensed quantity of fuel has been reached. To that end, the pilot valve 20 is closed first of all (cf. FIG. 9). A restricted fuel flow can then flow via the bypass 21. The restriction of the valve is controlled by a computer (not illustrated): About 0.5 l before the selected dispensed quantity has been reached, the pilot valve closes in response to a signal from the computer. The same fuel pressure now builds up on both sides of the piston 9. The valve closes on account of the spring 40 and the larger effective area above the piston. The fuel now flows only through the bypass valve. If the predetermined quantity has been dispensed, the computer switches the bypass valve off.

A variant of a valve is shown by FIG. 4, where the valve piston 9, unlike in FIG. 1, is not surrounded by a diaphragm 9' but rather runs in a bush 9". In this configuration, the annular space 16 into which the supply duct 6 opens out is formed by a circular groove in the piston 9. The circular groove surrounds a sealing ring 43, which is placed onto the end-face circular bead which forms the endface opening end of the duct 10.

Figure 10:
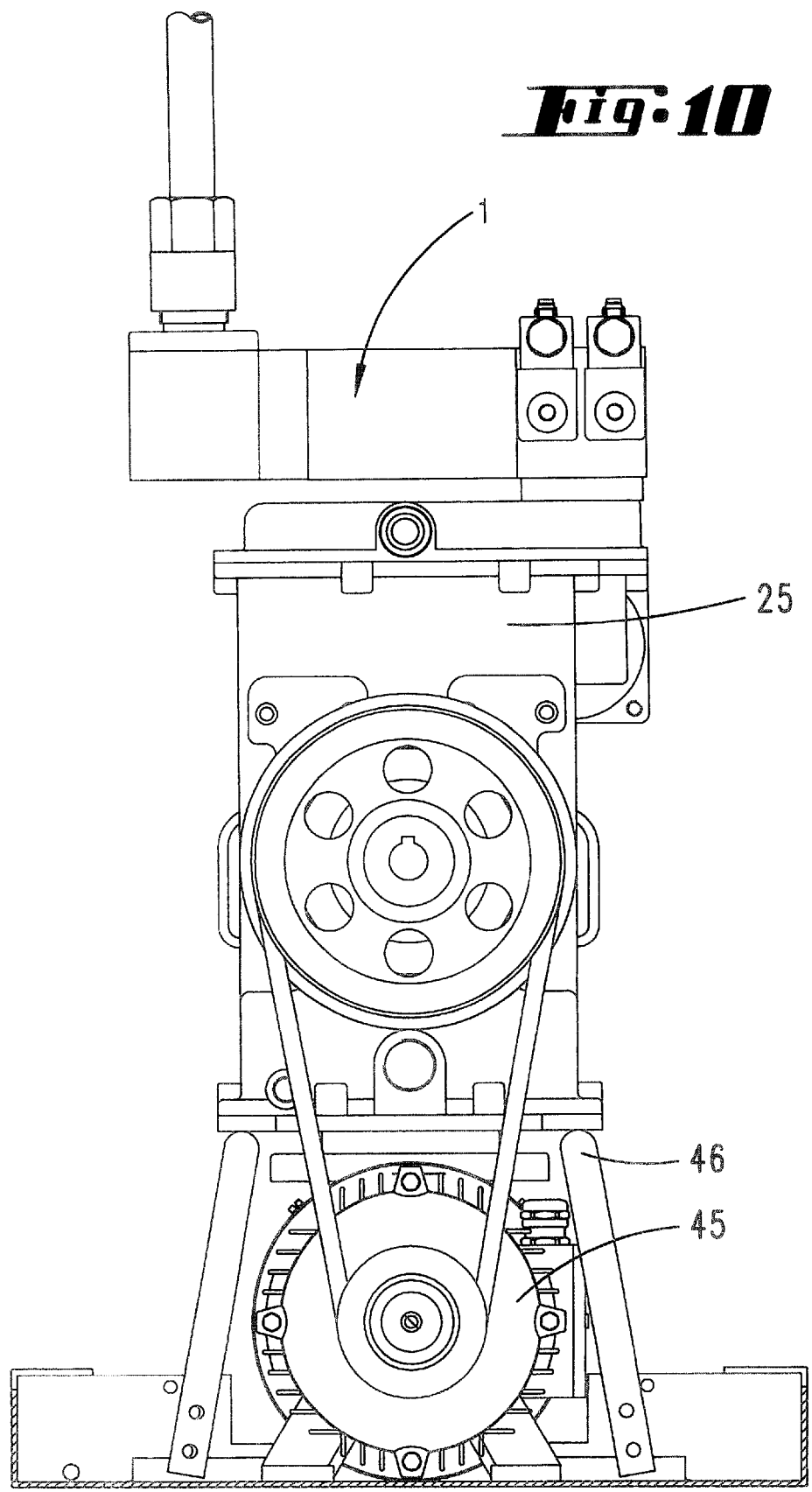
FIG. 10 shows an exemplary arrangement of the invention on a delivery pump.
Figure 11:
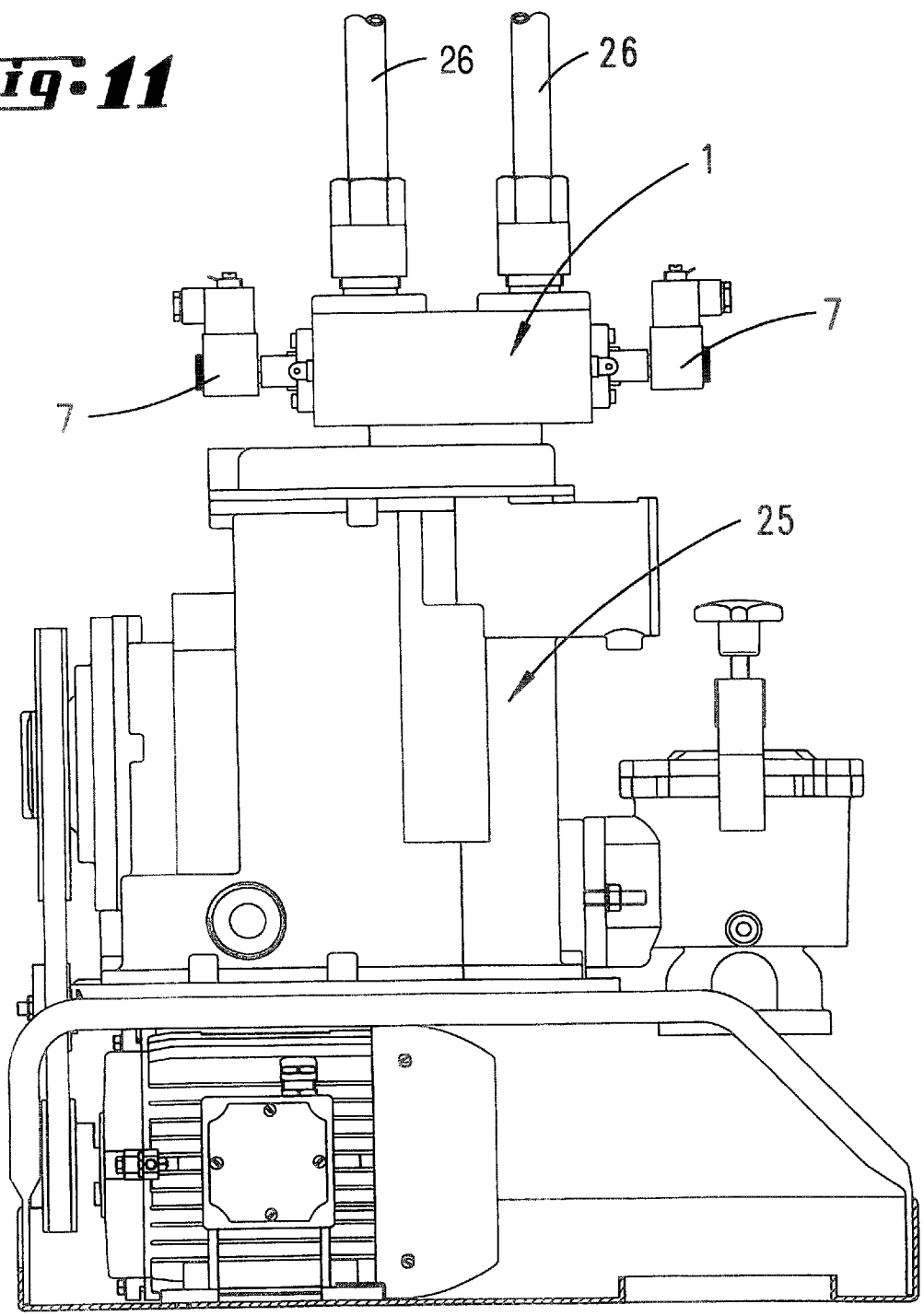
FIG. 11 shows an illustration in accordance with FIG. 10 offset through 90°.
Figure 12:
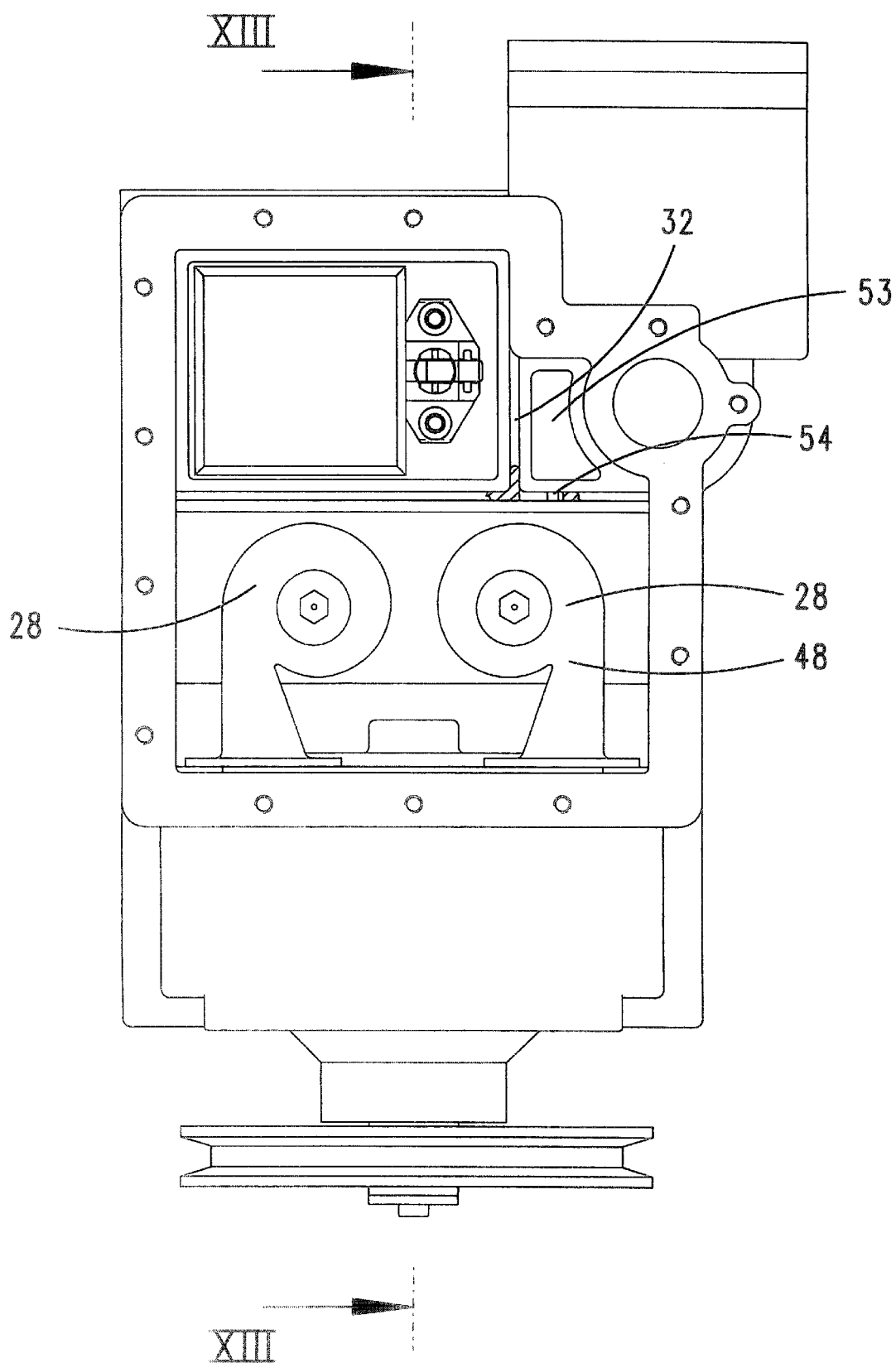
FIG. 12 shows the plan view of a delivery pump according to the invention, with the cover removed.
Figure 13:
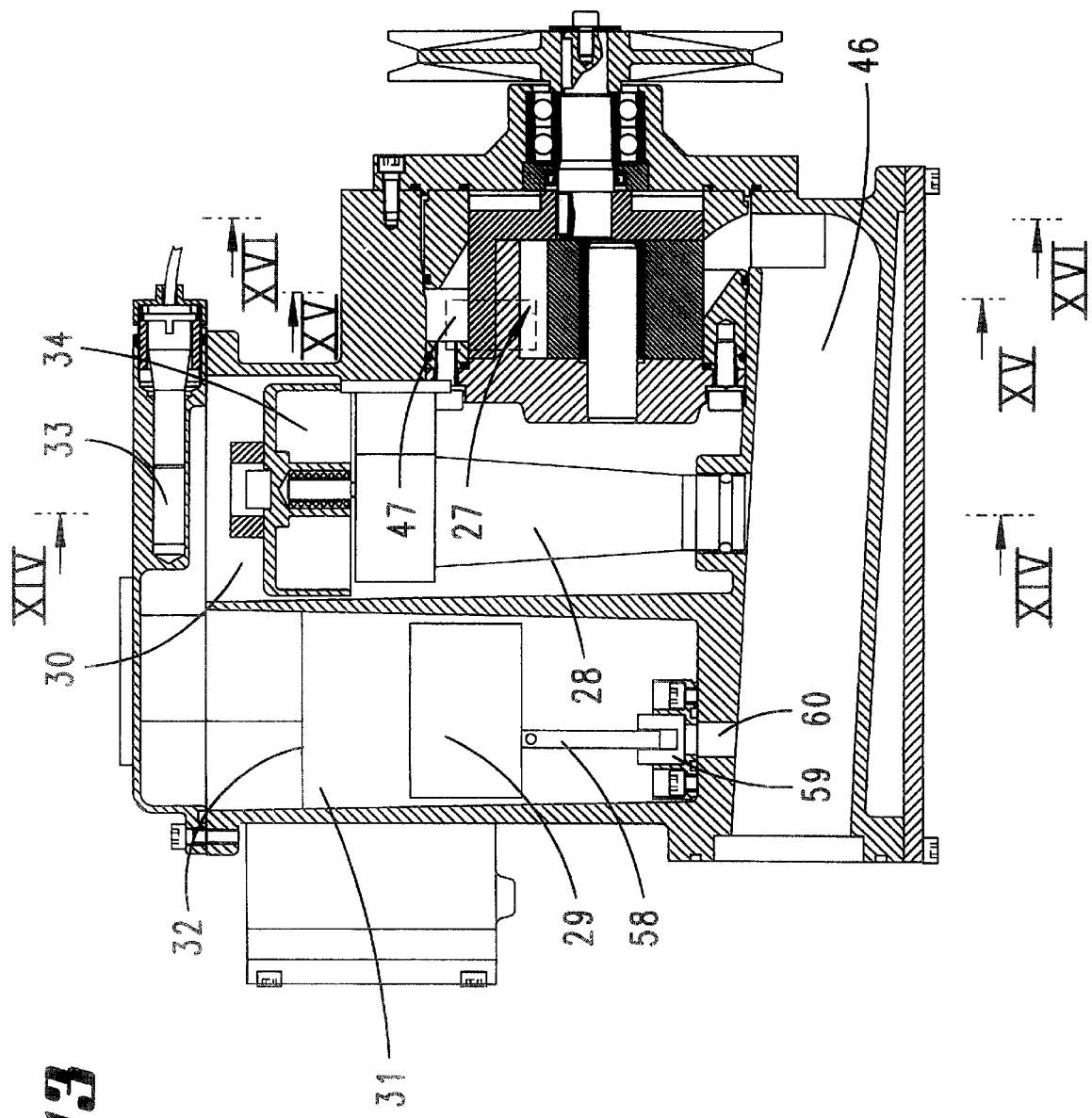
FIG. 13 shows a section along the line XIII—XIII in FIG. 12.
Figure 14:
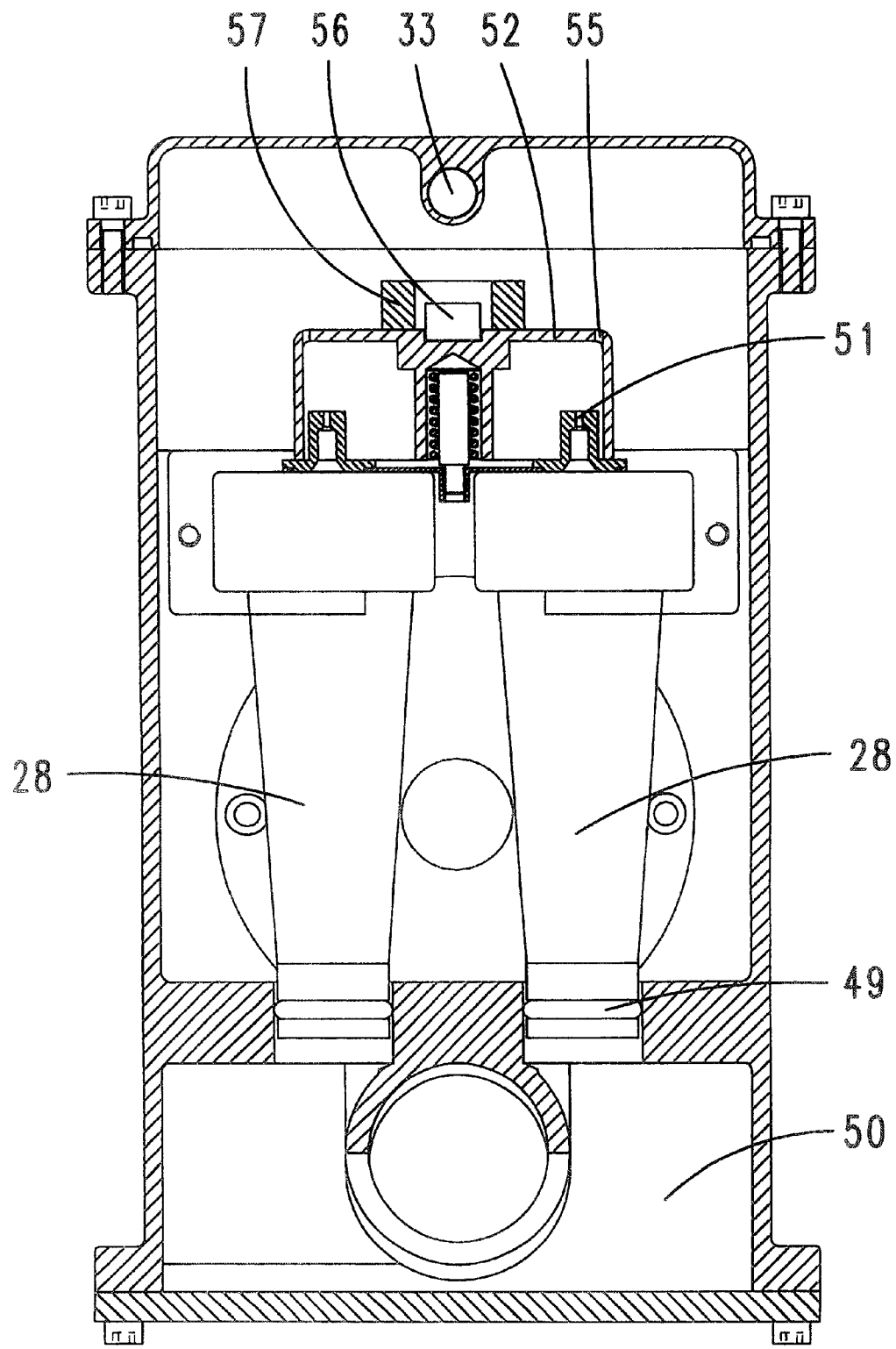
FIG. 14 shows a section along the line XIV—XIV in FIG. 13.
Figure 15:
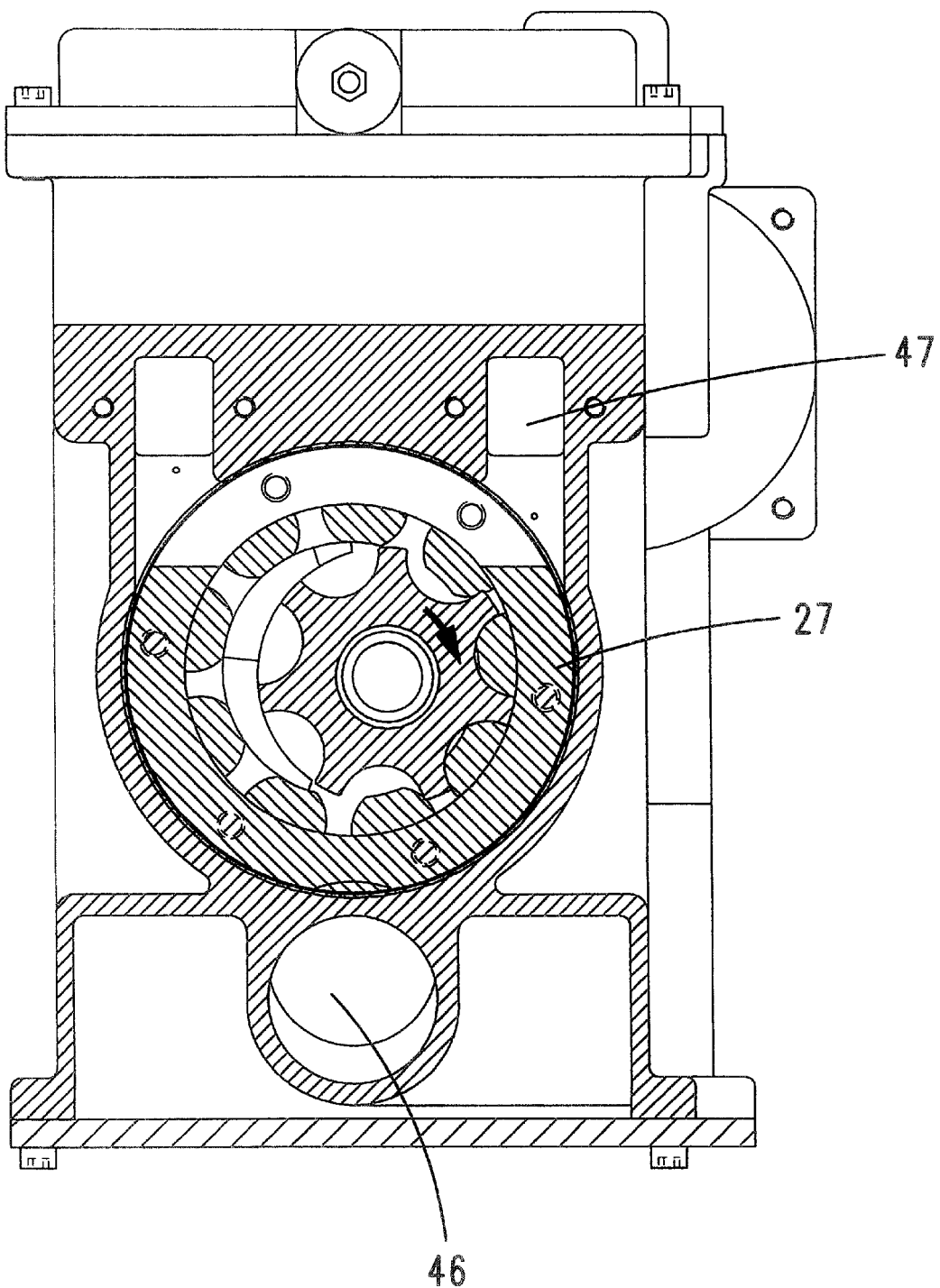
FIG. 15 shows a section along the line XV—XV in FIG. 13.
Figure 16:
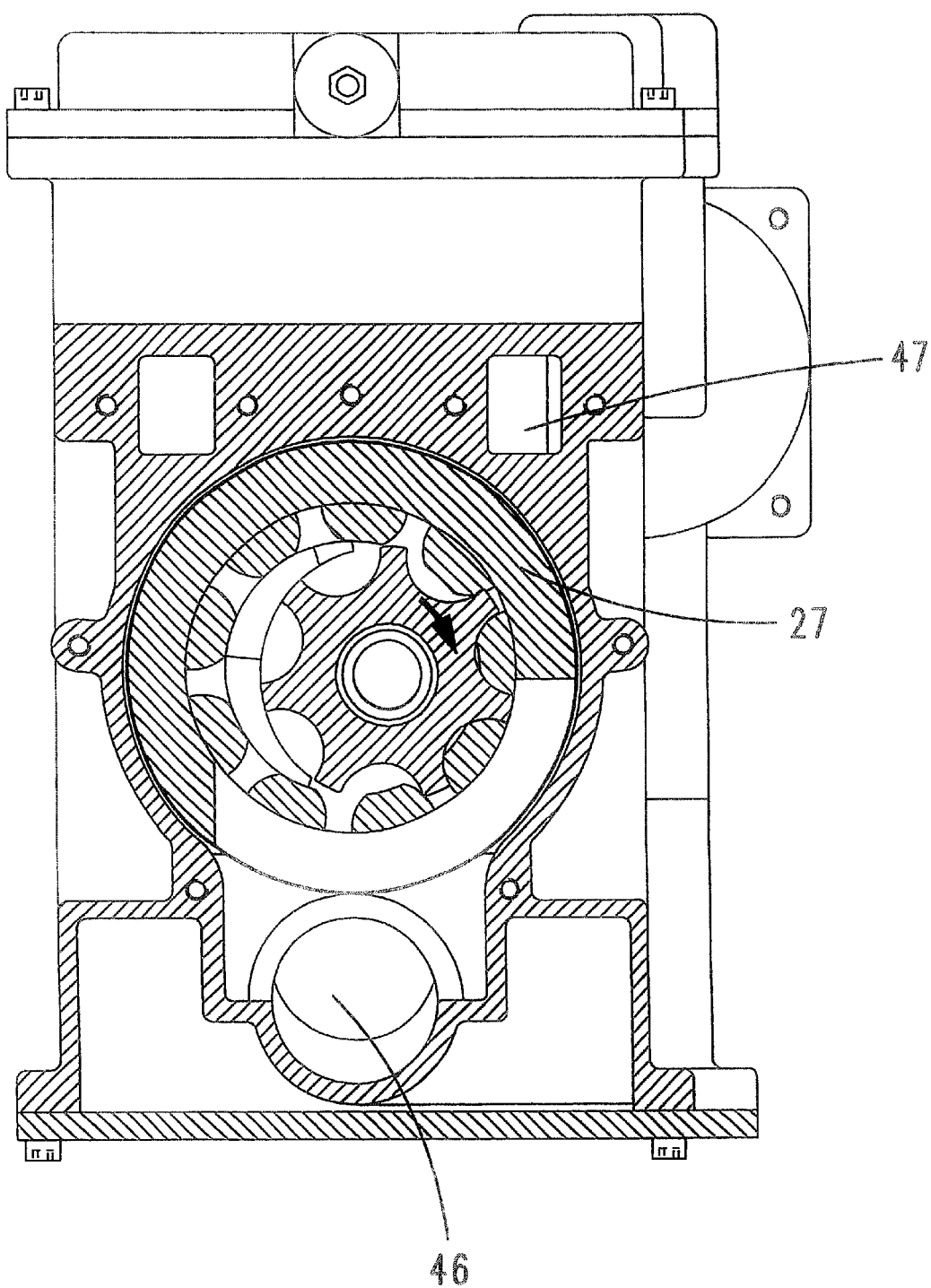
FIG. 16 shows a section along the line XVI—XVI in FIG. 13.

FIGS. 10 and 11 illustrate an overall arrangement of a delivery/measurement system comprising measuring block and pump. A drive motor 45 is situated underneath the pump 25. The above-described measuring block 1 with its valves 7 and outgoing lines 26 is situated above the pump.

The arrangement of measuring block, pump and electric motor one above the other is regarded as advantageous since this completes the overall system arrangement which is generally favorable in terms of space. This arrangement also enables the subcomponents which are combined modularly to be exchanged in a simple manner. The electric motor 45 can be removed from under the pump, which rests on stands 46, without the pump or the measuring block having to be removed. In the same way, the pump insert 27 provided in the pump can be taken out of the pump housing 25 if it is defective.

The pump insert is preferably an internal gear pump 27. The liquid sucked in by the internal gear pump 27 via the intake duct 46 is passed through the pressure ducts 47 and the tangential inlet connector 48 to the cyclones 28 and passes via their outlets 49 into the pressure chamber 50. The liquid is conducted from the pressure chamber 50 via a pressure duct and the pressure filter to the valves 5 and is directed further to the measuring devices.

When quantities of air or gas enter the intake line 46, they are passed, having been mixed with the liquid, from the pump 27 via the pressure ducts 47 and the tangential inlet connector 48 to the cyclones 28. The tangential entry into the cyclones 28 causes the liquid-gas-air mixture to undergo a rotary movement which, in terms of its circumferential speed, corresponds to the flow rate within the entire delivery system. In this case, the centrifugal force produced within the cyclone hurls the clear liquid outward and the quantities of gas and air that are present upward concentrically to the center of the cyclone. The quantities of gas or air driven out by the cyclones 28 escape through nozzles 51. A total of two cyclones 28 are provided which are arranged parallel to one another in a vertical extent. The cyclones extend downwardly in the shape of a funnel and open out into the pressure chamber 50.

During normal delivery operation, clear liquid flows through the nozzles 51 under the displacer 52 in the form of a bell. The liquid level under the displacer 52 and that in the interspace 53 are established at the same level since pressure equalization is effected by means of the hole 54. The liquid level is fixed by means of the overflow edge 32. The liquid level in the float space 31 is kept constant with the aid of a float device 29, which conveys the fuel back to the intake end 46 of the pump. Adjacent to the float space 31 is the first gas separation space 30, to which the cyclones are assigned and which is connected via a pressure equalization hole 54 to an interspace 53 which is part of the float space 31.

Small quantities of gas obtained during normal operation are separated by the cyclones 28 and conducted away via an equalization hole 55, without the displacer 52 being activated. The displacer 52 can move upward in the axial direction if a specific gas accumulation has formed underneath its bell. This can be done for example during initial start-up or in the event of a disruption. If the pump delivers gases, the latter accumulate under the displacer 52. Since they can escape only slowly via the equalization hole 55, an excess pressure is produced above the liquid level and causes the displacer 52 with its magnetic disk 56 to be raised. The approach of the magnetic' disk 56 causes the solenoid-operated switch 33 to open the circuit of the solenoid valves 20', 20 of the valves 5, with the result that the latter are closed. The fuel flow to the measuring device is interrupted. A spacer ring 57 is provided which serves as stop limitation.

An opening 60, which connects the chamber 31 to the inlet end 46, is closed and opened by the float 29 via an articulated joint 58 and a valve 59:

The gases which escape from the conveyed liquid and do not condense are guided away through suitable valve openings in the pump cover, with the result that the two chambers of the gas separator can be vented.

What is claimed is:

1. A device for metering quantities of liquid, the device comprising: a plurality of volume meters; an assigned valve arranged upstream of each volume meter; and a liquid supply which branches into individual supply lines opening out into the valves, wherein the valves and the volume meters are assigned to a housing configured in the form of a block, which housing has an inlet opening and supply ducts, which branch off from the inlet opening to the valves and form the individual supply lines, a first housing block forming the inlet opening and valve connection openings covered by a respective valve head, in which valve connection openings, a respective supply duct opens out and from which proceeds a respective connecting duct to the assigned volume meter, which connecting duct can be closed off by a sealing member of a valve, the volume meters being assigned to respective separate second housing blocks, each second housing block forming a rotor housing for two mutually engaging screw spindles of a screw-spindle meter, supported by axial bearings located substantially at opposed ends of each second housing block, which spindles allow axial through-flow, one end of each the respective second housing blocks covering a respective outlet opening in the associated connecting duct.

2. The device as claimed in claim 1, wherein each of the second housing blocks is seated by said one end on a side of the first housing block.

3. The device as claimed in claim 1, wherein the first housing block has mutually opposite ends, and wherein the valve connection openings are assigned to those mutually opposite ends.

4. The device as claimed in claim 1, wherein the first and second housing blocks essentially have a parallelepipedal shape.

5. The device as claimed in claim 1, wherein each valve sealing member can move in, and transversely with respect to, a separating plane between the first housing block and respective valve head.

6. The device as claimed in claim 1, wherein the supply duct opens into an annular space, which at least partly surrounds the opening in the connecting duct on the valve head side and is covered by an edge portion of the valve sealing member.

7. The device as claimed in claim 1, wherein one of the two screw spindles of each volume meter bears a pulse generator wheel, wherein each respective second housing block supports a sensor in a sensor housing.

8. The device as claimed in claim 7, wherein each pulse generator wheel is a rotor provided with at least one magnet, and each respective sensor is a magnetic sensor for monitoring rotation of the rotor.

9. The device as claimed in claim 1, wherein each valve head comprises at least one actuating element for an associated valve sealing member.

10. The device as claimed in claim 1, wherein the valve sealing member is controlled by means of a pilot valve.

11. The device as claimed in claim 1, which has a bypass between the supply duct and connecting duct and a valve for closing said bypass.

12. The device as claimed in claim 1, wherein the inlet opening has a nonreturn valve.

13. The device as claimed in claim 1, wherein the second housing block forms two parallel, overlapping bores for receiving the spindles, and chambers for receiving the axial bearings that support the spindles, which chambers are open at the end, adjoin the bores and have a larger cross section than the bores.

14. The device as claimed in claim 1, which has a U shaped block arrangement, with two second housing blocks arranged parallel to one another forming distal ends of the U and the first housing block forming the Joining, base portion, of the U with its inlet opening located centrally.

15. The device as claimed in claim 14, additionally comprising a delivery pump having an outlet opening issuing upward wherein the first and the second housing blocks are arranged, with the spindles lying horizontally and with the inlet opening pointing downward, seated above the outlet opening of the delivery pump.

16. The device as claimed in claim 15, wherein the delivery pump has an internal gear pump, which can be removed from a pump housing.

17. The device as claimed in claim 15, wherein the delivery pump, has a gas separator having two cyclones arranged parallel to one another.

18. The device as claimed in claim 15, wherein the delivery pump, has a gas separator with a float-controlled liquid recirculation.

19. The device as claimed in claim 15, wherein the delivery pump has a gas separator having two chambers, which are separated from one another by an overflow edge.

20. The device as claimed in claim 15, wherein the valves can be controlled by a solenoid-operated switch assigned to the delivery pump.

21. The device as claimed in claim 20, wherein the solenoid-operated switch can be activated by a displacer, which moves when relatively large quantities of gas are separated.

22. A device for metering quantities of liquid, the device comprising:

a plurality of fluid flow meters having screw spindles arranged with parallel axes of screw rotation; a liquid distribution unit having an inlet port and providing branching paths from the inlet port for delivery of liquid from a source of the liquid via outlet ports of the distribution unit to respective ones of the flow meters; and a plurality of valves disposed upstream of respective ones of the flow meters and located at the outlet ports of the distribution unit;

wherein the distribution unit has the configuration of an elongated block, extends transversely of the axes of the meters, and supports the meters and their respective valves, the meters extending from a wall of the distribution unit; and the metering de vice further comprises a plurality of pilot valves located between the inlet and the outlet ports for selectively applying the liquid to respective ones of the outlet ports the pilot valves being located at opposed ends of the distribution unit to provide a compact configuration to an assembly of the distribution unit with the meters attached thereto.

* * * * *